W. S. SCHERMERHORN.
Bottle for Promoting Vegetation.

No. 198,159. Patented Dec. 11, 1877.

Witnesses.
E. H. Crawford.
E. F. Benham.

Inventor.
Winfield S. Schermerhorn,
by William N. Dow.
Attorney.

UNITED STATES PATENT OFFICE.

WINFIELD S. SCHERMERHORN, OF CASTLETON, NEW YORK.

IMPROVEMENT IN BOTTLES FOR PROMOTING VEGETATION.

Specification forming part of Letters Patent No. 198,159, dated December 11, 1877; application filed November 14, 1877.

*To all whom it may concern:*

Be it known that I, WINFIELD S. SCHERMERHORN, of Castleton, in the county of Rensselaer and State of New York, have invented certain new and useful Improvements in Bottles for Promoting Vegetation, of which the following is a full and exact description.

The object of my invention is to furnish a bottle for promoting the rapid growth of esculent plants, so as to prevent the development of their woody fibers, thereby rendering them more tender and palatable, said bottle being constructed in such manner that it can be readily removed from the plant without doing injury to either the bottle or plant.

The invention consists in constructing such bottles in separable parts, as herein set forth.

Figure 1:
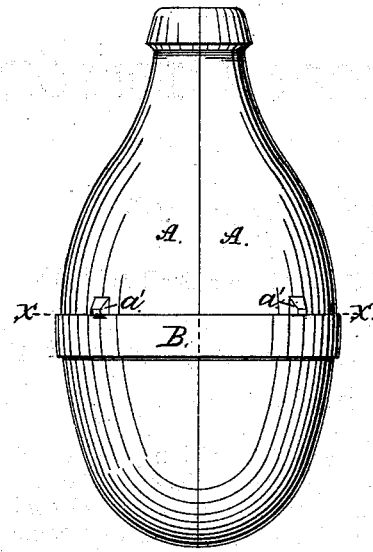
Figure 2:
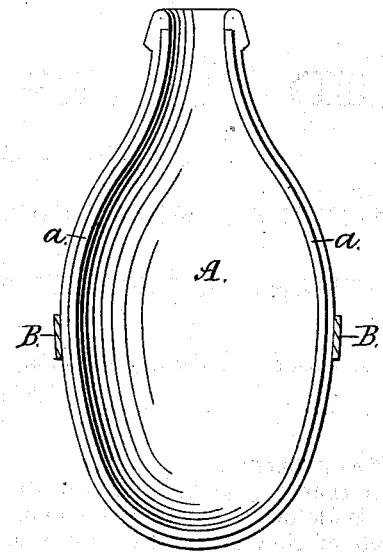
Figure 3:
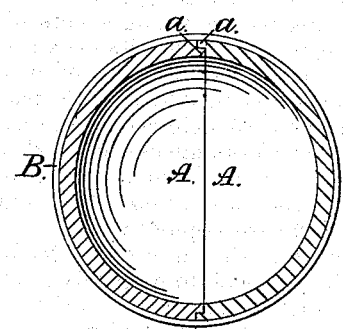

In the accompanying drawing, which forms a part of this specification, Figure 1 is a side elevation of the bottle; Fig. 2, a detached view of one of the sections; Fig. 3, a horizontal section at the line X X, and Fig. 4 a longitudinal section of a modification of my invention.

As illustrated in the drawing, A represents the two sections, which, when joined together longitudinally, form a complete bottle, as shown in Fig. 1. These sections may be made of glass or other suitable material, and should be provided with the interlocking flanges *a*, or other suitable means, for insuring their proper retention together. They are secured by the hoop B, which is prevented from passing too far on the bottle by the stops *a'*, formed on the sections A.

While I preferably employ the hoop B as a means for securing the sections together, it is obvious that numerous devices may be substituted for this purpose, and I do not confine myself to it as the only means for effecting it.

Openings for the admission of air and the eduction of the gases evolved by the plant may be formed, if necessary, at the joint of the sections, or by perforations made in the body of each section.

While these bottles may be used for forcing the growth of many different plants, they are designed more especially for promoting the growth of asparagus, the young shoots of it being enveloped by the bottle, (its neck being inserted in the soil to hold it erect,) by which the sun's rays are concentrated upon the plant, which fills the bottle, so as to render the usual bundling of the sprouts unnecessary. When the proper growth is attained the hoop B is removed and the sections A taken away uninjured and ready for subsequent use.

Figure 4:
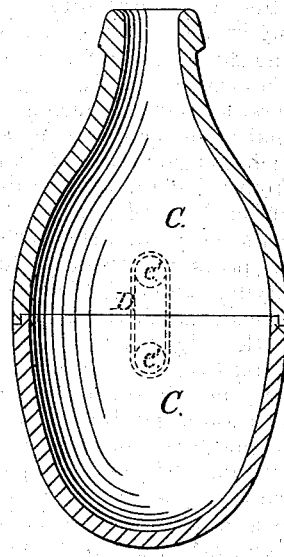

In the modification shown in Fig. 4 the bottle is parted transversely into sections C, which are jointed by interlocking rims *c*, and which may be secured together by the links D, engaging upon studs *c'*, formed on the sections, or by any suitable means.

I claim as my invention—

A partible bottle for promoting the growth of plants, constructed substantially in the manner herein shown and described.

WINFIELD S. SCHERMERHORN.

Witnesses:
WILLIAM H. LOW,
E. A. CRAWFORD.